United States Patent Office 3,808,270
Patented Apr. 30, 1974

3,808,270
PROCESS FOR PRODUCING TRICHLORO-
METHANE SULFENYL CHLORIDE
Hans-Dieter Rupp, Erlenbach, Gerhard Meyer, Obern-
burg, Hans-Georg Zengel, Kleinwallstadt, and Helmut
Magerlein, Obernburg, Germany, assignors to Akzo
N.V., Arnhem, Netherlands
No Drawing. Filed Oct. 2, 1972, Ser. No. 294,463
Claims priority, application Germany, Nov. 2, 1971,
P 21 54 305.5
Int. Cl. C07c 145/00
U.S. Cl. 260—543 H    10 Claims

ABSTRACT OF THE DISCLOSURE

Process for producing trichloromethane sulfenyl chloride by reacting carbon disulfide and chlorine in a reaction zone filled with granular active carbon completely immersed with liquid reaction mixture while maintaining temperatures in the range of above 40° C. up to about 135° C. over said reaction zone. The process provides almost quantitative yields of the desired product.

---

The invention is concerned with the production of trichloromethane sulfenyl chloride, which can also be identified as perchloromethylmercaptan.

Trichloromethane sulfenyl chloride has previously been prepared by the catalytic chlorination of carbon disulfide first described by Rathke, Ann. 167, page 195 (1873). The catalyst used for this method was essentially iodine added in a quantity of 0.1 to 1.0%. The reaction proceeds in accordance with the following equations:

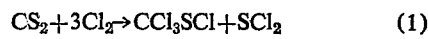

$$CS_2 + 3Cl_2 \rightarrow CCl_3SCl + SCl_2 \qquad (1)$$

$$2CS_2 + 5Cl_2 \rightarrow 2CCl_3SCl + S_2Cl_2 \qquad (2)$$

$$CS_2 + Cl_2 \rightarrow CCl_4 + S_2Cl_2 \qquad (3)$$

In addition to sulfur dichloride, sulfur chloride and carbon tetrachloride, the reaction also forms thiophosgene and other compounds as unwanted by-products. Although those more volatile by-products such as carbon tetrachloride and sulfur dichloride can be removed from the reaction mixture by distillation, it is extremely difficult to separate trichloromethane sulfenyl chloride from sulfur chloride by this method. Trichloromethane sulfenyl chloride decomposes when distilled at normal pressure due to its thermal instability. At a very reduced pressure, the boiling points of trichloromethane sulfenyl chloride and sulfur chloride differ only slightly from each other. Processes based on a chemical conversion of sulfur chlorides into easily separable compounds have therefore been proposed in order to isolate trichloromethane sulfenyl chloride from the chlorination mixture.

Sulfur chlorides can be destroyed, for example, by hydrolysis in an aqueous medium especially by steam distillation. See Organic Synthesis, Coll. vol. 1, 502 (1962); and Authenrieth and Hefner, Ber. 58, 2151 (1925). Enormous quantities of waste gases (HCl, SO₂) and sulfur, all of which are technically very difficult to control, are formed in this process. Hydrolytic decomposition may also be carried out in the presence of an oxidizing agent, e.g. excess chlorine (German Pat. No. 915,335). Sulfuric acid and hydrochloric acid are formed from the sulfur chlorides by this process. This process of separation is expensive due to the large additional quantity of chlorine required. An alternative procedure, in which the sulfur chlorides are converted into polythionates, thiosulfate, chlorides, etc. by reacting the chlorination mixture with sulfur dioxide, neutral or acid sulfides is also difficult and expensive (German Pat. No. 910,297). Moreover, there are separation processes in which the sulfur chlorides are converted into sulfur, thionyl chloride and sulfur dioxide by the action of sulfur trioxide (U.S. Pat. No. 2,664,442) or into hydrochloric acid, sulfur dioxide and sulfur by the action of aliphatic ethers or alcohols (U.S. Pat. No. 2,545,285).

It will be apparent to those skilled in this art how expensive it is to work up the chlorination mixtures produced by the known processes. The proportion of by-products is high and the yield and purity of trichloromethane sulfenyl chloride is correspondingly low. Moreover, chlorination processes as described above can only be carried out discontinuously, i.e., as batch processes.

Continuous processes for the preparation of trichloromethane sulfenyl chloride have also been suggested. In the process of the East German patent specification No. 36,260, chlorination is carried out in columns charged with filling bodies in the presence of iodine as the catalyst. In a chlorination zone of the column, which is maintained at a temperature of 15° C. to 25° C., 2.25 to 3 mols of chlorine are reacted per mol of carbon disulfide, the remainder of the chlorine remaining in solution in carbon disulfide. This mixture is conveyed to a second column where the dissolved free chlorine reacts with carbon disulfide in a reaction zone maintained at 15° C. to 25° C. This process requires long reaction times, especially in the second reaction zone. The chlorination mixture consists of 42% of by-products of low volatility and 58% of a residue or sump containing trichloromethane sulfenyl chloride. The yield of trichloromethane sulfenyl chloride isolated from this residue by steam distillation is only 60 to 70% of theory.

Another continuous process has been disclosed in German Auslegeschrift No. 1,229,518. In this instance, chlorination is carried out in reaction towers in the presence of 5 to 38% aqueous hydrochloric acid, optionally in a chlorinating solvent, e.g. in trichloromethane sulfenyl chloride, at 0° C. to 46° C. This reaction proceeds in accordance with the equation:

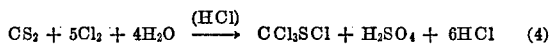

$$CS_2 + 5Cl_2 + 4H_2O \xrightarrow{(HCl)} CCl_3SCl + H_2SO_4 + 6HCl \qquad (4)$$

Although this process provides high yields with only relatively small quantities of by-products, it requires the consumption of additional chlorine for conversion of the sulfur chlorides into $H_2SO_4$ and HCl.

From German Offenlegungsschrift No. 1,900,659, it is further known to carry out the reaction of carbon disulfide with chlorine to form trichloromethane sulfenyl chloride in the presence of active carbon. In this process, carbon disulfide and chlorine are reacted together in a molar ratio of between 1:3 and 1:4 at temperatures of 0° C. to 40° C. in a reaction tube filled with a granular active carbon. When observing these prescribed conditions, the only by-products formed are sulfur dichloride and small quantities of carbon tetrachloride.

One object of the present invention is to provide a process for producing trichloromethane sulfenyl chloride from carbon disulfide and chlorine in a generally more advantageous commercial manner, particularly in avoiding the production of by-products which are difficult and/or expensive to separate.

Another object of the invention is to provide good yields of trichloromethane sulfenyl chloride according to Equation 1 above while eliminating or substantially reducing the effect of side reactions such as those according to Equations 2 and 3 above.

Yet another object of the invention is to provide a more useful and effective continuous process for producing trichloromethane sulfenyl chloride on a commercial scale at high yields and over long periods of time without loss of catalyst activity.

These and other objects and advantages of the invention will become more apparent upon consideration of the following detailed specification of the invention.

It has now been found, in accordance with the invention, that one can achieve a substantial improvement in the reaction of carbon disulfide with chlorine in the presence of a granular active carbon catalyst by the steps which include introducing the carbon disulfide and chlorine into a reaction zone occupied by said catalyst consisting essentially of the active carbon, completely immersing the catalyst in the reaction zone with a liquid phase reaction mixture maintained at different temperatures over the reaction zone ranging from above 40° C. up to about 135° C. distilling off from this liquid phase a gaseous mixture of mainly carbon disulfide and sulfur dichloride which is then condensed and returned to the reaction zone, and withdrawing a liquid mixture consisting essentially of trichloromethane sulfenyl chloride and sulfur dichloride as reaction products from the reaction zone.

In the known process disclosed by German Offenlegungsschrift No. 1,900,659, chlorination is carried out in a trickling reactor, namely in a reactor filled with granular active charcoal which is not flooded or immersed with liquid (see also Synthesis, 1971, No. 9, pages 478–9). Surprisingly, it has now been found that contrary to prior assumptions, carbon disulfide and chlorine can be reacted together to give practically quantitative yields according to Equation 1 even at temperatures in the range of above 40° C. up to 135° C. if the reactor is flooded with the liquid reaction mixture, in other words if the reactor is filled to such an extent with the liquid reaction mixture consisting essentially of the carbon disulfide and liquid reaction products that the level of the liquid phase is kept above the filling or layer of active carbon. Whereas carbon disulfide and the resulting liquid reaction mixture trickle through the layer of active charcoal in the known process, the whole filling or layer of active carbon is immersed in the liquid phase in the process of the present invention.

The reaction temperatures of this invention, which occur in that part of the reactor wherein the reaction according to Equation 2 takes place, are above the boiling points of carbon disulfide (46.2° C.) and sulfur dichloride (69° C.). These two constituents of the reaction mixture therefore boil under the reaction conditions and thereby remove the heat of reaction. They are then removed as a vapor or gas mixture at the top of the reactor, conveyed to a conventional condenser and finally returned as condensate to the reactor.

Carbon disulfide and chlorine may be introduced in a molar ratio of between about 1:3 and 1:3.5. This molar ratio is preferably between 1:3.2 and 1:3.3. The molar ratio of chlorine:carbon disulfide should be at least 3:1. An excess of carbon disulfide should be avoided because it reacts with sulfur dichloride in accordance with Equation 5 as follows to form sulfur chloride:

$$CS_2 + 5SCl_2 \rightarrow 3S_2Cl_2 + Cl_3CSCl \qquad (5)$$

On the other hand, there is no harm in using an excess of chlorine. The exces chlorine escapes from the top of the reactor together with sulfur dichloride and carbon disulfide vapor and may then be recovered, for example by condensation, and the chlorine may then be returned to the reaction zone if desired.

Different temperatures within the range of 40° C. to 135° C. prevail in the interior of the reactor, i.e. over the length of the reaction zone. The temperature in the lower half of the usually vertical reactor is 40° C. to 80° C. In the upper half of the reactor, temperatures in the region of 80° C. to 135° C. are established, depending on the height to which the reactor is charged with active carbon, the reaction temperature generally rising uniformly from 80° C. to a temperature in the range of 110–135° C. on ascending the reactor and then dropping to about 70–90° C. in a relatively thin layer of active carbon at the top end of the reactor.

Formation of trichloromethane sulfenyl chloride in accordance with Equation 2 takes place in the upper half of the reactor, especially in the upper third of the upper half. Sulfur chloride and chlorine are in equilibrium with sulfur dichloride in accordance with the following Equation 6, although at the high temperatures in this zone the equilibrium is in favor of sulfur chloride so that only a small amount of sulfur dichloride is formed:

$$S_2Cl_2 + Cl_2 \rightleftharpoons 2SCl_2 \qquad (6)$$

Adjustment of the equilibrium between sulfur dichloride and sulfur chloride in the direction of sulfur chloride is also favored by the fact that active carbon, in the presence of which the equilibrium adjustment takes place, absorbs very little chlorine at high temperatures. In addition, the solubility of chlorine in sulfur chloride is low at these temperatures.

The relatively hot zone of the reactor, where optimum formation of trichloromethane sulfenyl chloride takes place, contains a reaction mixture consisting of trichloromethane sulfenyl chloride, sulfur chloride, a little sulfur dichloride and carbon disulfide. The major portion of carbon disulfide and the sulfur dichloride formed in accordance with Equation 6 are continuously removed or vaporized off by distillation. Trichloromethane sulfenyl chloride, sulfur chloride, and the remaining sulfur dichloride and carbon disulfide gradually reach the lower, cooler zone of the reactor and the carbon disulfide then undergoes practically quantitative reaction in accordance with Equations 2 and 5. The equilibrium between sulfur chloride and sulfur dichloride progressively shifts in favor of sulfur dichloride. At the lower end of the reactor, sulfur chloride has been almost quantitatively converted into sulfur dichloride.

The condensate consisting of carbon disulfide and sulfur dichloride may be continuously introduced, for example at the top of the reactor or at any other point in the upper half end of the reactor. The condensate should not be introduced in the lower half of the reactor because with the lower temperatures prevailing in this portion of the reactor, there is the risk of the carbon disulfide being only incompletely driven off or chlorinated with a residue reaching the sump where it would react with sulfur dichloride in accordance with Equation 5 to form unwanted sulfur chloride.

The active carbon used should be as free as possible from metals such as iron, antimony, tin, aluminum or copper since even traces of these metals catalyze the formation of carbon tetrachloride in accordance with Equation 3. Suitable active carbons free from metal are available commercially and may also be easily obtained from an active carbon which contains metal by washing it with dilute aqueous hydrochloric acid and then with water and then drying. It is advisable to use a highly abrasion resistant active carbon having a particle size of preferably 2.5 to 4 mm. The active carbon is desirably fixed in position as a catalyst bed or layer in the reactor, for example by means of one or more sieve plates, in order to prevent floating or loss of the granular material.

The optimum quantities of carbon disulfide and chlorine introduced per unit of time in a continuous reaction depend on the dimensions of the reactor. As is usual in such gas-liquid reactions carried out in vessels or tubes with filling bodies, i.e. catalysts or other packings, the reaction is carried out below the so-called flooding point, i.e. the velocity of the vapor and quantity of vapor are so calculated that the liquids are still just capable of flowing downwardly. Furthermore, the reactor is preferably charged in such a way that the zone of formation of trichloromethane sulfenyl chloride, which is the hottest zone in the reactor, is as far as possible in the upper third of the upper half of the reactor. If the reactor is insufficiently charged so that the active carbon available is not optimally utilized, this fact can be recognized by the zone of formation of trichloromethane sulfenyl chloride slipping down into the lower portions of the reactor.

The reactor used for carrying out the process according to the invention may, for example, be almost completely filled with granular active carbon although spaces free from active carbon are often left above and below the filling. The filling of active carbon may be in the form of a continuous bed or layer but it may also be arranged in several layers separated from each other. In all cases, the bed of active carbon should preferably be fixed in position in the reactor. Carbon disulfide is introduced into the top or upper end of the reactor, preferably in liquid form, and chlorine is advantageously introduced at the lower end of the reactor. The sump is formed below the point where chlorine is introduced and is continuously discharged at such a rate that the level of liquid phase in the reactor remains practically constant. Operation of the reactor may be started, for example by filling the reactor with sufficient liquid carbon disulfide and then introducing only chlorine until all the carbon disulfide introduced has reacted with chlorine.

The mixture of trichloromethane sulfenyl chloride, sulfur dichloride and dissolved chlorine discharged from the sump as a liquid reaction product contains only negligible quantities of sulfur chloride as an impurity. The crude product generally requires no further purification apart from removal of the low boiling constituents by simple distillation.

This crude product may be used as such, for example for the preparation of pesticides. If desired, however, it may also be purified in known manner, for example by steam distillation. The yield obtained in the process according to the invention is practically quantitative.

Compared with known chlorination processes which are based on Rathke's method, the process according to the present invention is distinguished by the fact that the only by-products formed are sulfur dichloride and very small quantities of carbon tetrachloride.

Since this is practically no formation of sulfur chloride, difficult and expensive separation processes are not required for isolating the desired trichloromethane sulfenyl chloride. The use, separation and recovery of iodine are also eliminated by the present invention because no additional catalyst is required beyond the essential active carbon. Chlorination in the presence of active carbon as the catalyst proceeds extremely rapidly, selectively and almost quantitatively and therefore allows high rates of throughput to be employed in a continuous operation. Although the process according to the German patent specification No. 36,260 can be carried out continuously, the apparatus required therein is substantially more complicated than that proposed for carrying out the process according to the present invention. In addition, the yields obtained are not nearly as high as those obtained in the present process.

One special advantage of the process according to the invention compared with the process according to German Auslegeschrift No. 1,229,518 resides in a substantially lower chlorine requirement. In addition, valuable sulfur dichloride is obtained as a by-product in the present process instead of hydrochloric acid and sulfuric acid which are of no particular value. Moreover, the filling of active carbon used in the process according to the invention is undiminished in its activity even after long use in a continuous process.

The known process of German Offenlegungsschrift No. 1,900,659 is disadvantageous compared with the process according to the invention in that heat liberated in the reaction must be removed by vigorous external cooling. If large reaction vessels are used, as is necessary for production of trichloromethane sulfenyl chloride on a commerical scale, the installation of expensive cooling devices is necessary. Moreover, in this prior process it is not possible to use a simple reaction vessel filled with granular active carbon. Instead, the use of complicated multiple tube reactors is necessary and care must be taken to ensure that all the tubes are uniformly supplied with reactants. In the process according to the invention, on the other hand, removal of heat is considerably simpler. The heat of reaction liberated on the active carbon, which is the actual situs of the reaction, is directly transmitted to the liquid and from there it is removed from the reaction zone by the evaporation of carbon disulfide and sulfur dichloride. It is therefore not necessary to regulate the temperature in the reactor of the present invention by means of indirect heat exchange and consequently even large reactors are very simple to operate.

The invention is illustrated by the following example:

EXAMPLE

The reactor used was a 2000 mm. long reaction tube having an internal diameter of 100 mm. which was provided at the top end with inlets for fresh carbon disulfide and for the recycled liquid mixture of carbon disulfide and sulfur dichloride. This top end is also provided with a discharge conduit for the vapor consisting of a mixture of carbon disulfide and sulfur dichloride. The reactor is further provided at its lower end with an inlet for chlorine and a discharge conduit for the liquid recation product. A filling or bed of 12 liters (4900 g.) of active carbon having an internal surface of 1350 to 1500 m.$^2$/g. and a particle size of 3.5 to 4 mm. was positioned in the reactor beginning on a supporting plate or grid located 100 mm. above the base of the reactor to form a continuous layer of the active carbon of 1500 mm. in length.

At the upper end of the reactor, carbon disufide was first introduced in such an amount that the liquid level rose above the layer of active carbon. Chlorine gas was then introduced into the lowest part of the reactor, i.e. the sump, at the rate of 6.4 kg./hr. until no more chlorine was taken up. The liquid level was kept constant during this time.

When the reactor had been started as described above, 2.1 kg./hr. (1670 ml./hr.) of carbon disulfide and 6.4 kg./hr. of chlorine gas, corresponding to a molar ratio of $CS_2:Cl_2$ of 1:3.3, were simultaneously and continuously fed into the reactor. The resulting heat of reaction heated the liquid reaction mixture in the reaction tube to boiling. Carbon disulfide and sulfur dichloride vapor escaping from the reaction mixture were continuously drawn off at the top of the reaction tube, condensed in a reflux condenser and then returned to the top of the reaction tube. The liquid level was again kept constant by continuously discharging the chlorination product from the sump. The sump product was discharged at an average rate of 8.5 kg./hr. This crude product had the following composition as determined by gas chromatography:

|  | Percent by weight |
|---|---|
| $Cl_2$ | 8.1 |
| $SCl_2$ | 32.0 |
| $CCl_4$ | 0.3 |
| $S_2Cl_2$ | 0.8 |
| $CCl_3SCl$ | 58.8 |

The selectivities are calculated from this composition to be 99.4% for trichloromethane sulfenyl chloride and 97.8% for sulfur dichloride. (The dissolved chlorine which could be easily recovered and used again was neglected in this calculation.) This crude product can be purified by a simple distillation to separate the sulfur dichloride ($SCl_2$) from the trichloromethane sulfenyl chloride ($CCl_3SCl$) with only trace amounts of other impurities.

Good yields continue over long periods of operation and without losing the effectiveness of the active carbon catalyst.

The invention is hereby claimed as follows:

1. A process for producing trichloromethane sulfenyl chloride which comprises:
   reacting carbon disulfide with chlorine at a molar ratio of $Cl_2:CS_2$ of at least 3:1 in a reaction zone occupied by a catalyst consisting essentially of a granular active carbon;

completely immersing the catalyst in said reaction zone with a liquid phase reaction mixture consisting essentially of the carbon disulfide and liquid reaction products, said liquid mixture being maintained at different temperatures over said reaction zone ranging from above 40° C. up to about 135° C.;

distilling off from said liquid phase a gaseous mixture of carbon disulfide and sulfur dichloride which is then condensed and returned to the reaction zone; and withdrawing a liquid mixture consisting essentially of trichloromethane sulfenyl chloride and sulfur dichloride as reaction products from said reaction zone.

2. A process as claimed in claim 1 wherein said carbon disulfide and chlorine are reacted in a molar ratio of about 1:3 to 1:3.5.

3. A process as claimed in claim 1 wherein said carbon disulfide and chlorine are reacted in a molar ratio of about 1:3.2 to 1:3.3.

4. A process as claimed in claim 1 carried out continuously in a vertical reaction zone containing said active-carbon immersed in the liquid phase reaction mixture, liquid carbon disulfide being continuously introduced at the upper end of said reaction zone and chlorine gas being introduced at the lower end of said reaction zone at the rate of at least 3 mols of chlorine per mol of carbon disulfide, said gaseous mixture being withdrawn at the upper end of the reaction zone for condensation and then returned to said reaction zone and said liquid reaction products being withdrawn at the lower end of said reaction zone.

5. A process as claimed in claim 4 wherein the chlorine and carbon disulfide are continuously introduced in a molar ratio of chlorine:carbon disulfide of 3:1 to 3.5:1.

6. A process as claimed in claim 4 wherein the lower half of said reaction zone is maintained at temperatures of from above 40° C. up to approximately 80° C. and the upper half of said reaction zone is maintained at temperatures of approximately 80° C. up to about 135° C.

7. A process as claimed in claim 6 wherein the temperature in said upper half of the reaction zone rises from 80° C. to within a range of 110°–135° C. near the top of the reaction zone and then drops to about 70°–90° C. in a thin layer of active carbon at the top end of the reaction zone.

8. A process as claimed in claim 4 wherein said reaction zone is filled with a fixed bed of active carbon having a particle size of about 2.5 to 4 mm. and being substantially free of metals which catalyze the formation of carbon tetrachloride.

9. A process as claimed in claim 4 wherein the hottest zone in the reactor, corresponding to the optimum formation of trichloromethane sulfenyl chloride is located within the upper third of the upper half of the reactor.

10. A process as claimed in claim 4 wherein the sulfur dichloride is separated from the trichloromethane sulfenyl chloride in the liquid reaction product by distillation.

References Cited
UNITED STATES PATENTS 3,673,246    6/1972    Meyer et al. _____ 260—543 H LORRAINE A. WEINBERGER, Primary Examiner R. D. KELLY, Assistant Examiner